United States Patent [19]

Okuyama et al.

[11] Patent Number: 4,717,195

[45] Date of Patent: Jan. 5, 1988

[54] INSTRUMENT PANEL CONSTRUCTION WITH STAY

[75] Inventors: Hiroo Okuyama, Isehara; Katsuya Tsunoda, Yokohama, both of Japan

[73] Assignee: Nissan Motor Company, Ltd., Japan

[21] Appl. No.: 639,346

[22] Filed: Aug. 10, 1984

[30] Foreign Application Priority Data

Aug. 20, 1983 [JP] Japan .................................. 58-150950

[51] Int. Cl.$^4$ ...................... B62D 25/14; A44B 17/00
[52] U.S. Cl. ........................................ 296/72; 24/297;
248/221.3; 248/544; 403/330; 180/90
[58] Field of Search .................... 296/70, 72; 280/752;
180/90; 248/544; 24/289, 293, 297; 248/221.3,
221.4; 211/191, 192, 183; 403/329, 330

[56] References Cited

U.S. PATENT DOCUMENTS

| | | | |
|---|---|---|---|
| 2,338,658 | 1/1944 | Morehouse | 248/544 X |
| 3,897,848 | 8/1975 | Arnston et al. | 280/752 X |
| 3,907,326 | 9/1975 | Arnston et al. | 280/752 |
| 4,307,864 | 12/1981 | Benoit | 248/221.3 |
| 4,340,199 | 7/1982 | Brock | 248/544 |
| 4,342,439 | 8/1982 | Bruner | 248/544 |
| 4,356,601 | 11/1982 | Kimura | 24/297 |
| 4,393,561 | 7/1983 | Yuda | 24/297 |
| 4,400,011 | 8/1983 | Matsuno | 296/194 X |
| 4,444,373 | 4/1984 | Hayashi | 248/544 |
| 4,506,419 | 3/1985 | Mitomi | 24/297 |
| 4,534,088 | 8/1985 | Ricke | 24/297 X |
| 4,560,186 | 12/1985 | Onitsuka et al. | 24/297 X |

OTHER PUBLICATIONS

Service Periodical No. 401 (BL-6), "Introduction of 910 Series" issued by Nissan Motor Company Limited, pp. 158 and 159, a Japanese Periodical as discussed in the patent application as filed under Background of the Invention.

Primary Examiner—Robert B. Reeves
Assistant Examiner—Russell D. Stormer
Attorney, Agent, or Firm—Lowe, Price, LeBlanc, Becker & Shur

[57] ABSTRACT

According to the present invention, an instrument panel and a stay are assembled with a device which slidably holds the stay relative to the instrument panel, the device preferably including a hook formed on the stay and a temporary latch formed on the instrument panel.

5 Claims, 6 Drawing Figures

INSTRUMENT PANEL CONSTRUCTION WITH STAY

BACKGROUND OF THE INVENTION

The present invention relates to an instrument panel construction including an instrument panel and at least one stay.

A known instrument panel construction is disclosed in Pages 158 and 159 of Service Periodical No. 401 (BL-6) "INTRODUCTION OF 910 SERIES" issued by NISSAN MOTOR COMPANY LIMITED. According to this known construction, as shown in FIG. 1 an instrument panel I of monoblock mold of synthetic resin is used. The instrument panel I has an upper edge IU adapted to be secured to mounting brackets 1a of a dash upper panel 1 of a vehicle body and side edges IS adapted to be secured to mounting portions 2a of front side pillars 2.

Mounted on the instrument panel I are constituent parts including, for example, an instrument pad 3, a meter cover 4, a glove box 5, a combination meter 6, a cluster lid 7, an ash tray 8, an air conditioner console panel 9 and a radio unit 10. Thus, the whole assembly heavy. There is, therefore, a tendency for the instrument panel I to bend downward due to its own weight because the instrument panel I is not structurally rigid enough to withstand this weight.

In order to reinforce the instrument panel against being bent downward, a pair of stays S are so arranged as to support the middle portion of the instrument panel I between the side edges IS by a vehicle body.

Describing now how to assemble the instrument panel construction and install it in the vehicle body referring to FIGS. 1 and 2, the constituent parts are mounted on the instrument panel I, then the stays S are secured by bolts to the instrument panel I. This subassembly is carried to a vehicle assembly line where it is installed to a vehicle body. As best seen in FIG. 2, each of the stays S has an upper end secured to the mounting bracket 1a by bolt means 13 together with the upper edge IU of the instrument panel I and a lower end secured to a mounting bracket 11a by mounting screws 12, the mounting bracket 11a being secured to a tunnel portion 11 of a vehicle floor panel.

Although not seen in FIG. 2, each of the stays S is formed with two mounting screw receiving holes spaced in a longitudinal direction thereof, while the instrument panel I has two portions, each of which is formed with two mounting screw receiving holes. Each of these mounting holes is circular and has a diameter substantially equal to the corresponding one of mounting screws B. The stays S are secured to the instrument panel I by the mounting screws B, each extending through the holes formed in the stays S and the mating holes formed in the instrument panel I.

In FIG. 2, the reference numeral 15 designates a wire harness extending inside of the instrument panel I, the reference numeral 16 a front windshield, the reference numeral 17 a trim for concealing the margin of the windshield 16, the reference numeral 18 a garnish concealing a gap between the upper end of the instrument panel I and the windshield 16.

The subassembly where the stays S are rigidly secured to the instrument panel I presents a problem as follows. That is, once the side edges IS of the instrument panel I are secured to the mounting portions 2a (see FIG. 1) of the front side pillars 2 of the vehicle body, it is often experienced that the upper ends and/or lower ends of the stays S do not mate with the corresponding mounting brackets 1a and 11a of the vehicle body. This is because the locations of the mounting brackets 1a and 11a diverge transversely relative of the vehicle body from one vehicle body to another owing to an error which may take place in assembling each of the vehicle bodies in the assembly line. The upper and lower ends of the stays S, therefore, have to be secured to the mounting brackets 1a and 11a after pulling them transversely of the vehicle body till they mate with the mounting brackets. Pulling the upper and/or lower ends of the stays S causes the instrument panel I to deform at the junctions with the stays S. This deformation of the instrument panel I degrades the external appearance thereof and defeats a good mating relationship of the constituent parts with the instrument panel I.

SUMMARY OF THE INVENTION

With the recognition of the above problem, an object of the present invention is to provide an instrument panel construction which can be installed in a vehicle body even if mounting brackets on a vehicle body diverge without causing such a substantial deformation of an instrument panel as to degrade the external appearance of the instrument panel or defeating a good mating relationship of constituent parts with the instrument panel.

According to the present invention, an instrument panel and a stay are assembled with a device which slidably holds the stay relative to the instrument panel, the device including a hook formed on either one of the instrument panel and stay and a temporary latch formed on the other of the instrument panel and stay.

DESCRIPTION OF THE PREFERRED EMBODIMENT

Figure 1:
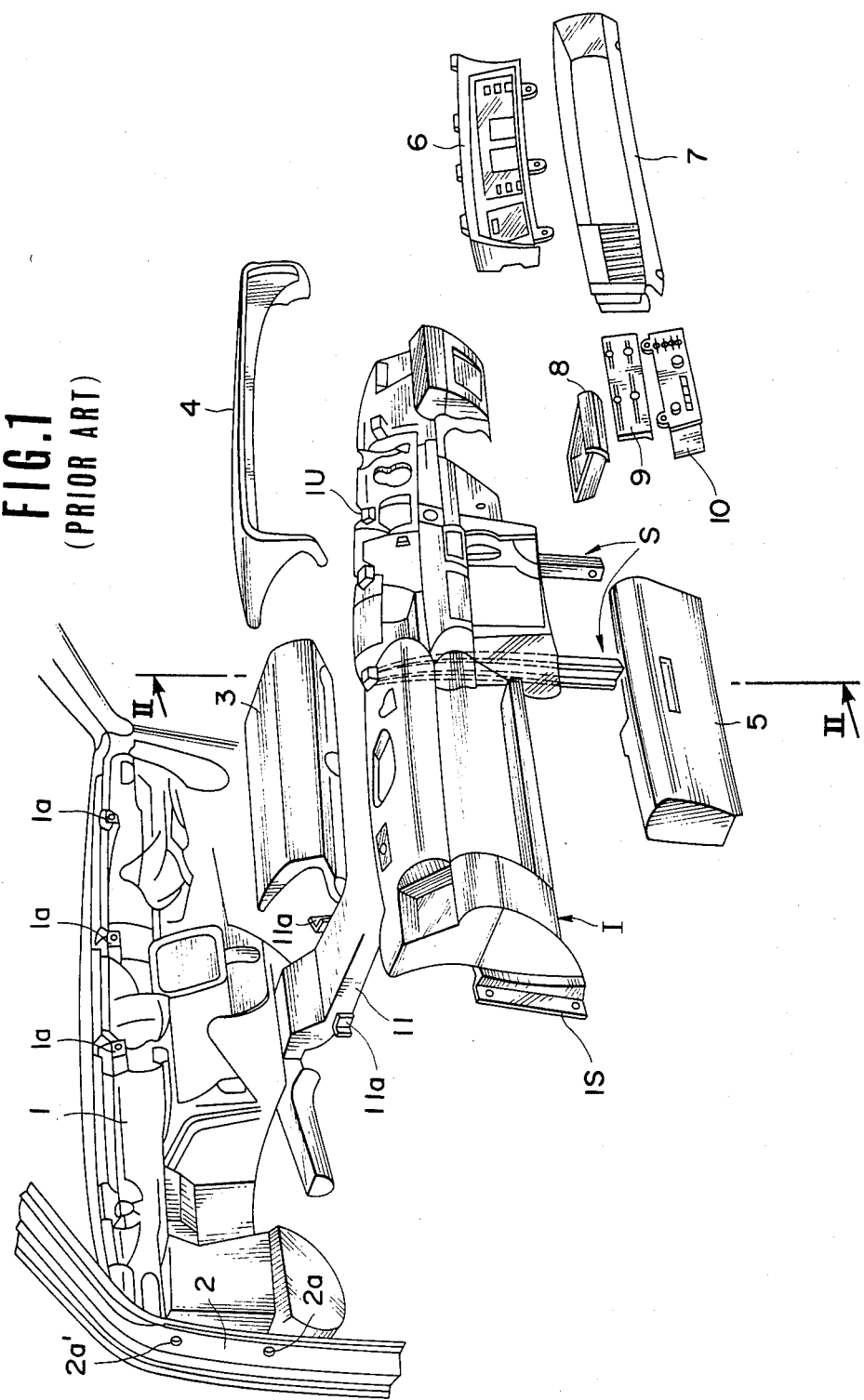
FIG. 1 is an exploded perspective view of the above discussed prior art instrument panel construction for an automatic vehicle body.
Figure 2:
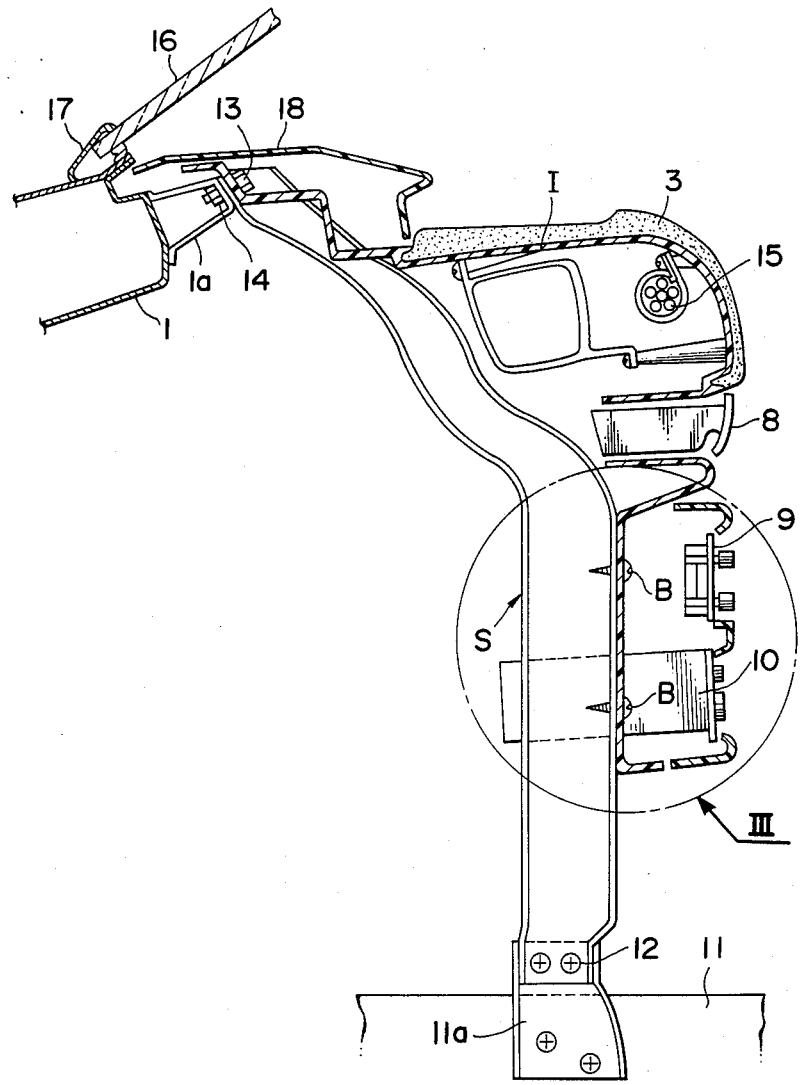
FIG. 2 is a sectional view taken through line II—II in FIG. 1.
Figure 3:
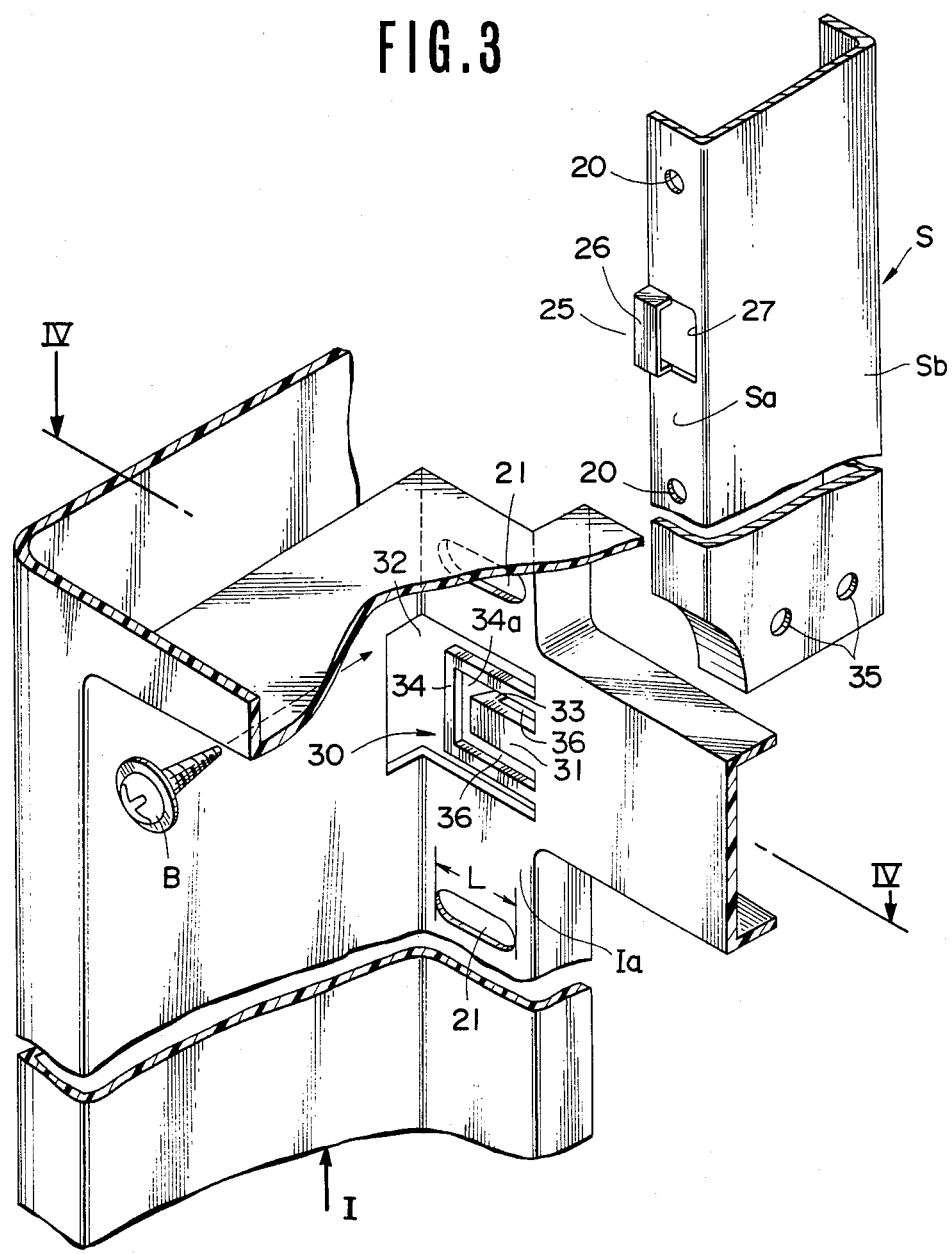
FIG. 3 is an enlarged fragmentary exploded view of a portion enclosed by a circle III in FIG. 2 and shows an embodiment of an instrument panel construction according to the present invention.

Referring to FIG. 3, a preferred embodiment of an instrument panel construction according to the present invention is described. This embodiment is substantially the same as the instrument panel construction as discussed in connection with FIGS. 1 and 2, except for that portion in FIG. 2 encircled by a phantom line illustrated circle designated by the reference numeral III. This portion embodying the present invention is illustrated in FIG. 3.

Referring to FIG. 3, the instrument panel construction according to the present invention comprises an instrument panel I and a pair of stays, one of them being shown and designated by the reference character S. The instrument panel I has two vertically extending portions or walls, only one of them being shown and designated by the reference character Ia, which are spaced with each other in a longitudinal direction thereof (see FIG. 1 also). As shown in FIG. 3, the stay S is in the form of a U channel configuration for increased rigidity. The stay S includes two parallel side walls, only one being shown and designated by Sa, extending from an end wall Sb. Formed through the side wall Sa are a pair of mounting screw receiving holes 20, each having a diameter substantially equal to a mounting screw B, which are spaced in a longitudinal direction of the stay S. Formed through the vertically extending wall Ia of the instrument panel I, to which the side wall Sa of the stay S is adapted to be secured, are a pair of elongate mounting screw receiving holes 21 which are adapted to mate with the above mentioned circular mounting holes 20. Each of the elongate mounting holes 21 extends in the longitudinal direction of the instrument panel I. The length L of each of the mounting hole 21 is set considering divergence of the locations of the mounting brackets 1a and 11a (see FIG. 2) in transverse direction of the vehicle body due to an error which may take place in assembling vehicle bodies.

For slidably holding each of the stays S relative to the instrument panel I, a hook 25 is formed on each of the stays S and a temporary latch 30 is formed on each of the vertically extending wall Ia.

In this embodiment, the hook 25 is formed on one side wall Sa of the stay S at a portion between the pair of mounting holes 20. This hook 25 comprises a rectangular cutout 27 extending inwardly from the edge of the side wall Sa and a projecting bridge portion 26 disposed near the edge of the side wall Sa and extending across the cutout 27. The projecting bridge portion 26 projects outwardly from the U channel of the stay S, thus extending toward the instrument panel I as viewed in FIG. 3 and has a cross section like an inverted U. The cutout 27, on the other hand, is rectangular in shape.

Figure 4A:
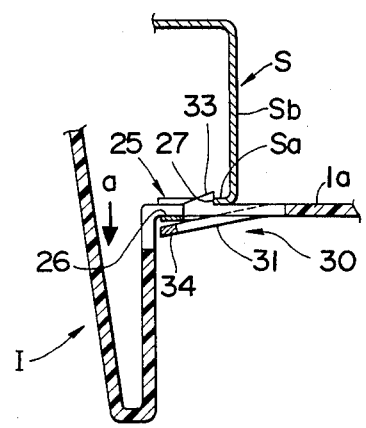
FIGS. 4(a) and 4(b) are sectional views taken through line IV—IV in FIG. 3 showing how stays are temporarily engaged with an instrument panel.

The temporary latch 30 which is adapted to engage with the hook 25 comprises a guide rib 31 and a bias rib 34. The guide rib 31 extends from one of side defining edges of a cutout 32 formed in the vertical wall Ia in a longitudinal direction of the instrument panel I. The guide rib 31 is adapted to be inserted into the projecting bridge portion 26 of the hook 25. The length of the guide rib 31 from one end thereof to an opposite end thereof is substantially the same as the longitudinal length L of each of the elongate mounting holes 21. As best seen in FIG. 4(a), a claw 33 is formed on the free end of the guide rib 31. The claw 33 is adapted to fit in the cutout 27 of the hook 25. The bias rib 34 is flexible to pivot about the side defining edge from which it extends. The bias rib 34 defines a rectangular opening 34a within which the guide rib 31 is disposed. The rectangular opening 34a has a vertically extending side which is slightly longer than a longitudinal length of the projecting bridge portion 26. The rectangular opening 34a has a horizontally extending side which is longer than the length L of each of the elongate mounting holes 21. As shown in FIG. 2, the stay S has a pair of mounting holes 35 formed through a low end portion thereof which are adapted to receive mounting screws 12 (see FIG. 2).

With this embodiment, each of the stays S is temporarily held by the instrument panel I by engaging the hook 25 with the temporary latch 30.

Figure 4B:
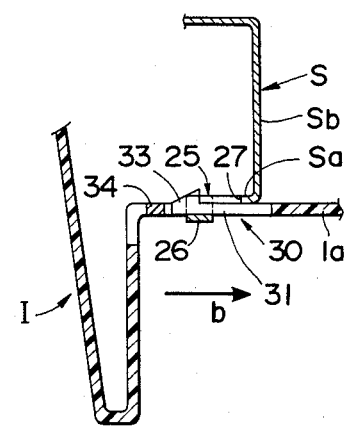
Figure 4C:
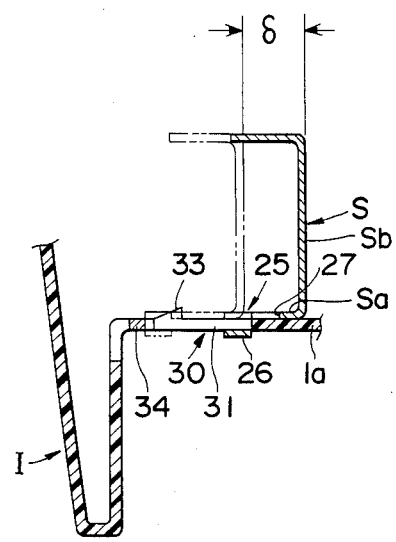
FIG. 4(c) is a similar view to FIG. 4(b) showing two limit positions of the movement of the stay relative to the instrument panel.

Describing now how to engage the temporary latch 30 with the hook 25 referring to FIG. 4(a), the stay S is pushed against the vertical wall Ia of the instrument panel I in a direction as indicated by an arrow a with the projecting bridge portion 26 of the hook 25 kept in contact with the vertical portion (as viewed in FIG. 3) of the bias rib 34. This movement of the stay S causes the bias rib 34 to rotate counterclockwise, as viewed in FIG. 4(a), thus allowing the cutout 27 to receive the claw 33 as illustrated in FIG. 4(a). In this illustrated position, the projecting bridge portion 26 has reached a position where it is adjacent the end of the guide rib 31. After assuming this illustrated position, the stay S is moved in a direction b which extends transversely to the direction indicated by the arrow a. This transverse movement of the stay S relative to the vertical wall Ia of the instrument panel I is allowed because the guide rib 31 can enter into the projecting bridge portion 26 in such a manner as to guide the projecting bridge portion 26 and the projecting bridge portion 26 can smoothly slide along slits 36 defined between the bias rib 34 and the remote sides of the guide rib 31. This transverse movement of the projecting bridge portion 26 relative to the bias rib 34 releases the force imposed on the bias rib 34 by the projecting bridge portion 26, thus allowing the bias rib 34 to resume its original position as shown in FIG. 4(b). In the illustrated position shown in FIG. 4(c), the bias rib 34 serves as a stop which blocks the separation of bridge portion 26 from the guide rib 31. thus, the engaged parts are maintained such that the projecting bridge portion 26 fits with the guide rib 31. This engagement state of the hook 25 with the temporary latch 30 ensures the temporary engagement of the stay S with the instrument panel I. Since, in this state, the projecting bridge portion 26 can move along the guide rib 31 between a first position (illustrated by a solid line) where it abuts against one cutout side defining edge and a second position (illustrated by a broken line) where it abuts against the vertically extending portion of the bias rib 34, the stay S can move relative to the instrument panel I in the longitudinal direction of the instrument panel I by a distance delta ($\delta$). Since the movement of the stay S relative to the instrument panel I in the longitudinal direction of the instrument panel I is restrained, the above mentioned relative movement of the stay S to the instrument panel I always ensures the mating of each of the circular mounting holes 20 with the elongate mounting hole 21. As a result, it is now possible to temporarily mount each of the stays S on the instrument panel I by the hook 25 and the temporal latch 30 and subsequently they are firmly mounted on the instrument panel I by the screws B.

With the hook 25 and the temporary latch 30, once the stays S are temporarily engaged with the instrument panel I in the above mentioned manner, they will not be separated during an outfitting process where numerous constituent parts are mounted on the instrument panel I and during the subsequent carrier process where the instrument panel is carried to an assembly line. Thus, no inconvenience is presented to labour work during these processes.

In installing the instrument panel I in the vehicle body, the side edges IS (see FIG. 1) of the instrument panel I are secured to mounting portions 2a of front pillars 2 of the vehicle body and then, after the stays S are slidably adjusted to have their upper and lower ends to the mounting brackets 1a and 11a, the stays S are fixedly mounted to the brackets 1a and 11a. After the instrument panel I and the stays are securely fixed to the vehicle body, the stays S are firmly fixed to the instrument panel I by the mounting screws B.

Since the stays S are slidable until they mate with the mounting brackets 1a and 11a, it has been made easy to secure the stays S to the mounting brackets 1a and 11a. In the process, since the stays S are temporarily engaged with the instrument panel I to allow the stays S to move relative to the instrument panel I in the transverse direction of the vehicle body, any dislocation of the mounting brackets 1a and 11a is offset. Finally, the stays S are fixedly secured to the instrument panel I by tightening screws B via the mounting holes 20, 21. In tightening the screws B, no bending stress is applied to the instrument panel I, thus causing no deformation of the instrument panel I.

The construction of the hook 25 and the temporary latch 30 are not limited to the construction as described in this embodiment and may be subject to any modification. If the construction of the hook and that of the temporary latch permit, the temporary latch may be formed on each of the stays and the hook may be formed in the instrument panel I. Although, in the above mentioned embodiment, the screw mounting holes 21 formed through the instrument panel I are elongated, it is possible that the screw mounting holes formed through the stays are elongated or all of the mounting holes on the instrument panel and the stays are elongated.

The present invention is advantageous even in those case where the stays are fixedly secured at their lower ends only to the vehicle body.

As described above, the instrument panel construction according to this invention allows the stays to be fixedly secured to the instrument panel after offsetting the dislocations of the mounting brackets of the vehicle body, thus effectively preventing deformation of the instrument panel. Thus, good outer appearance of the instrument panel and a good mating relationship of the constituent parts with the instrument panel are both maintained. Furthermore, since the stays are temporarily engaged with the instrument panel, the separation of the stays from the instrument panel is prevented, thus presenting no obstacle to workability in installing the instrument panel.

What is claimed is:

1. An instrument panel construction comprising:
   an instrument panel;
   a stay serving as a reinforcement of said instrument panel; and
   means for slidably holding said stay relative to said instrument panel;
   said slidable holding means including a hook formed on one of said instrument panel and said stay and a temporary latch formed on the other of said instrument panel and said stay;
   said hook including a wall formed with a cutout and a projecting bridge portion extending across said cutout near an open end of said cutout, and said temporary latch including a resilient bias rib having formed therethrough an opening and a guide rib formed with a claw at an end positioned within said opening, said projecting bridge portion slidably receiving said guide rib positioned within said opening, said projecting bridge portion being formed with a channel for slidably receiving said guide rib such that said claw thereof is disposed in said cutout, said resilient bias rib slidably engaging said wall, whereby said hook is slidably movable relative to said temporary latch with said wall engaging said resilient rib and said bridge portion engaging said guide rib, said hook being movable between a first position where further movement is limited by said claw abuttingly engaging said wall and a second position where further movement is limited by said bridge portion abuttingly engaging said bias rib.

2. An instrument panel construction as claimed in claim 1, wherein said hook is formed on said stay and said temporary latch formed on said instrument panel.

3. An instrument panel construction as claimed in claim 1, wherein:
   said resilient bias rib slidably engaged said wall formed with said cutout.

4. An instrument panel construction comprising:
   an instrument panel;
   a stay;
   said stay having a first wall formed with a first cutout, said first wall having two substantially parallel side edges and an end edge interconnecting said two side edges, said two side edges and said end edge of said first wall defining said first cutout,
   said stay having a projecting bridge portion extending across said first cutout near an open end of said first cutout, said bridge portion definng a channel;
   said instrument panel having a second wall arranged in parallel to said first wall, said second wall being formed with a second cutout, said second wall having two substantially parallel side edges and an end edge interconnecting said two side edges of said second wall, said two side edges of said second wall and said end edge of said second wall defining said second cutout,
   said instrument panel having a resilient bias rib extending from said end edge of said second wall thereof into said second cutout, said resilient bias rib being formed with a substantially rectangular opening and having two side portions and an end portion interconnecting said two side portions, said two side portions and said end portion of said resilient bias rib cooperating with said end edge of said second wall to define said substantially rectangular opening,
   said instrument panel having a guide rib extending from said end edge of said second wall into said substantially rectangular opening, said guide rib extending in parallel to said side portions of said resilient rib and spaced therefrom, said guide rib having a claw formed near one end thereof,
   said instrument panel being slidably coupled to said stay with said guide rib slidably extending through said channel of said bridge portion, said resilient rib slidably engaging said first wall and said claw being received by said first cutout,
   said second wall of said instrument panel being movable relative to said first wall of said stay between a first portion where further movement is limited by said claw abuttingly engaging said end edge of said first wall and a second position where further movement is limited by said bridge portion abuttingly engaging said end portion of said resilient rib.

* * * * *